(12) United States Patent
Murdock et al.

(10) Patent No.: US 8,195,723 B2
(45) Date of Patent: Jun. 5, 2012

(54) DOCUMENT MANAGEMENT SYSTEM FOR BUILDING MAINTENANCE AND OPERATIONAL DOCUMENTS

(75) Inventors: Michael Murdock, Cincinnati, OH (US); John MacLean, Alexandria, KY (US); John Rexhausen, Cincinnati, OH (US)

(73) Assignee: Turner Construction Company, Cincinnati, OH (US)

( * ) Notice: Subject to any disclaimer, the term of this patent is extended or adjusted under 35 U.S.C. 154(b) by 998 days.

(21) Appl. No.: 12/171,706

(22) Filed: Jul. 11, 2008

(65) Prior Publication Data

US 2010/0010966 A1   Jan. 14, 2010

(51) Int. Cl.
*G06F 17/30* (2006.01)
(52) U.S. Cl. .................. 707/822; 707/608; 707/826
(58) Field of Classification Search .................. 707/608, 707/822, 826
See application file for complete search history.

(56) References Cited

U.S. PATENT DOCUMENTS

| 7,080,144 | B2 * | 7/2006 | Boehmke | 709/225 |
| 7,698,647 | B2 | 4/2010 | Steeb, III | |
| 2002/0052814 | A1 * | 5/2002 | Ketterer | 705/35 |

* cited by examiner

*Primary Examiner* — Monica Pyo
(74) *Attorney, Agent, or Firm* — Porter Wright Morris & Arthur

(57) ABSTRACT

A document management system separates building information into a variety of data sets. Each data set has at least one common attribute that links it to all other types of data sets for the building. The information for maintaining the building is stored in a manner allowing users to retrieve only selective information from a vast amount of stored information. Users can query and retrieve data sets in a vast number of combinations relating to a specific building, or floor, room, system or system component in the building.

12 Claims, 4 Drawing Sheets

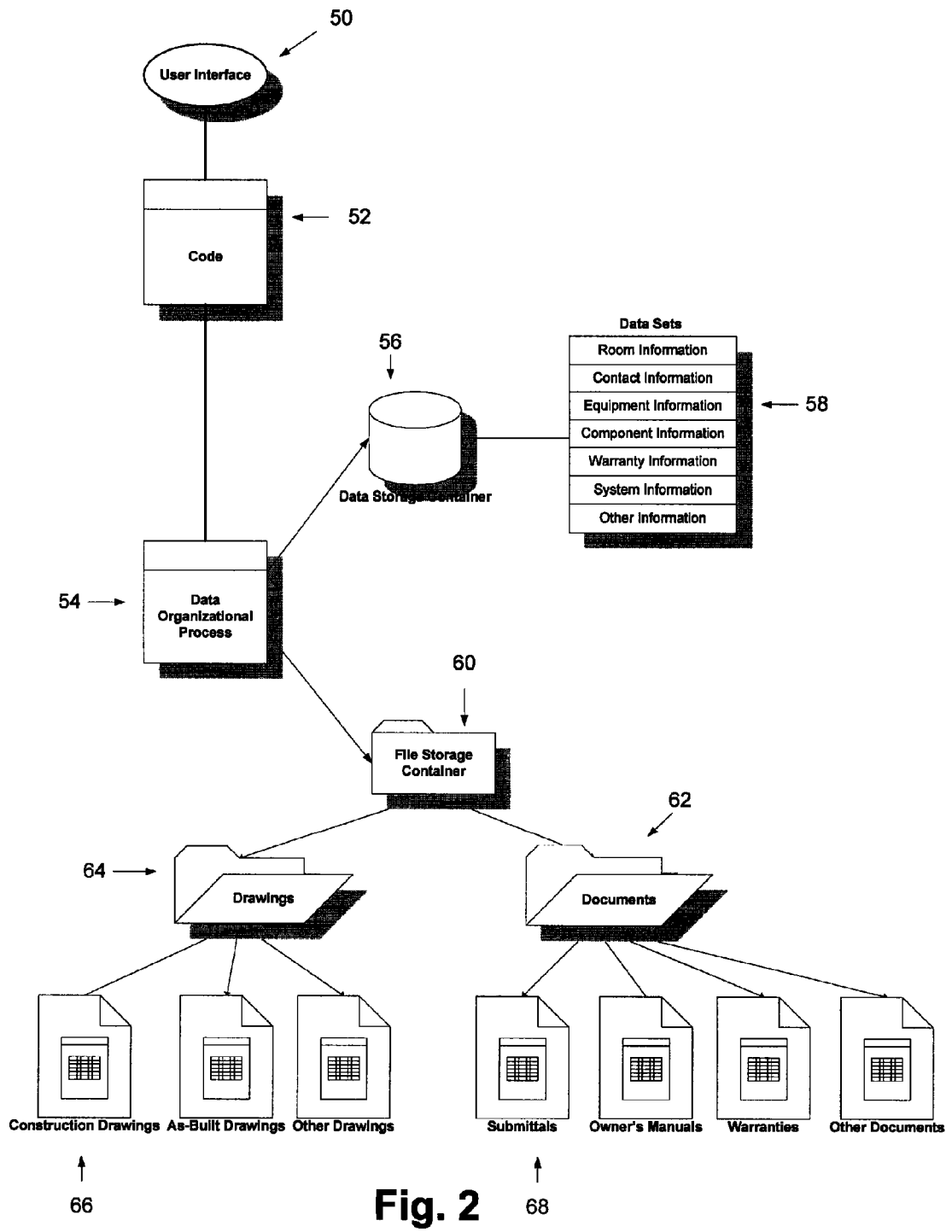

DOCUMENT MANAGEMENT SYSTEM FOR BUILDING MAINTENANCE AND OPERATIONAL DOCUMENTS

TECHNICAL FIELD AND INDUSTRIAL APPLICABILITY OF THE INVENTION

The present invention relates to document management and more particularly concerns a system for organizing and selectively retrieving documents for buildings, such as maintenance and operational documents. The invention will be specifically disclosed in connection with a linked organizational process that permits relevant documents to be stored according to both construction and non-construction categories.

BACKGROUND OF THE INVENTION

A major commercial building has a huge amount of information related to its construction, maintenance and operation. This information is of a multitude of related and unrelated types, ranging from engineering information, such as the structural and architectural drawings of the firm's infrastructure and mechanical and electrical systems, to information pertaining to building's appearance, such as the color of the paint or floor covering in a particular room. Additionally, this information is collected and contained in many different forms; such as drawings, warranties, agreements, owner's manuals, receipts, system schematics, and other documents. Such information is highly important, indeed, sometimes critical, to the efficient operation and maintenance of a building. For example, when maintaining a building, it is important to know the operational details of mechanical and electrical systems in the building, where the systems are located, the specifics of the system components, the maintenance schedules for mechanical and electrical components, and where to order replacements for non-durable components of the systems (filters, etc.). It also is important to know whether, when systems or components thereof, fail, the systems or components are covered by warranties. It also is helpful to know who to contact for replacements or repairs.

Historically, building owners have received this information at the conclusion of construction, when the building owner took possession of the building. Typically, the building owner then would simply store this colossal amount of unrelated information in file rooms or storage facilities organized and searchable typically by only one characteristic. For example, paint was in the paint folder and the warranty for the toilet seat was in the toilet seat folder, or perhaps the supplier folder. This inefficient organizational system, however, has proved futile when a building owner or manager needs to find information quickly.

It frequently is desirable to locate building information pertinent to a specific section of a building, such as a specific room, or a specific floor of the building. In order to find such information, it has been necessary in the past for the building owner or building manager to sift through thousands of records, none of which are organized according to specific section. For example, all electrical information for a particular room is organized according to an electrical category, without linkage between any particular electrical component and the room in question. Similarly, other information specific to the room is not organized in a manner that facilitates retrieval for a specific room. Finally, the file integrity for files containing building information is often suspect. For example, when problems are experienced in a particular location of a building, it is not uncommon for all of the pertinent drawings to be removed from the files and taken to the location of the problem. Often times, the removed drawing is damaged before its return, is not returned, or is not returned to its proper file location.

BRIEF SUMMARY

The present invention consolidates this vast amount of seemingly unrelated data in a logical and efficient manner by using unique elements common to each type of data. One example of the invention uses a novel way of organizing data to accomplish efficiency by separating building information into data sets such as floor information, warranty information, component information, equipment information, contact information, drawing information, system information, and other information. Each data set, however, has at least one common attribute that links it to all other data sets. Additionally, the present invention separates and stores different types of data within the data sets; separating text documents (contracts, warranties, manuals, etc.) from image documents (drawings, schematics, etc.). The information is stored in a manner allowing users to retrieve building information through an interface using a wide variety of search parameters. The user selects that desired information, and the system presents the information in an organized manner regardless of its form. With this type of graphical interface, users can visually query and retrieve various data sets in virtually any combination of information relating to a specific building; or the floor, room, system, equipment, or component information related to that building. For example, if the user selects all information relating to room "326" on the third floor, the system will present all of the necessary drawings, system information, components, equipment, supplier or installer contact information, contracts and other documents, and all other information relating to the construction or maintenance of that specific room. Finally, the system interface presents the data to users allowing them to make electronic copies of the documents and drawings without the risk of damaging or losing the originals.

One example of the invention includes a system adapted to store, organize, retrieve and present operational information for the construction and maintenance of a building. The system includes a computer processing device capable of executing, manipulated, and storing computerized building information. A computer readable medium with non-transitory computer executable instructions adapted to store and retrieve maintenance and operational documents for a building is used by the computer processing device. A computerized data storage device capable of storing computerized building information transfers computerized building information by a communication link with the computer processing device to transfer computerized building information between both devices. The communication link enables the system to execute the operations of providing a computerized data organization process to store, organize, and retrieve computerized building information. The computerized building information includes at least room information, system information, contact information, component information, equipment information, document information, drawing information, and other information related to the construction and maintenance of a building. Building data sets contain various physical electronic attributes. The building data sets contain at least those attributes relating to electronic drawings, electronic documents, and other types of electronic information associated with a specific building data set. A primary building data set containing a plurality of building information is provided to interrelate, either directly or indirectly, all building data sets to each other in a manner that facilitates the association and organization of multiple types of building information attributes. An interface provides access, and functions to present, and associate the computerized building information. The interface also provides the ability for the interface to query, load, delete, or modify desired building information stored within building data sets. A data organization process is provided which includes building data sets, with each of the building data sets having at least one or more predetermined specific attributes referenced in at least one other building data set. A method of organizing and presenting unrelated computerized building information requested by the interface is provided by interrelating every building data set in order to relate previously unrelated information by including unique building attributes in each building data set so that any building information requested may be presented with any other piece of building information regardless of whether the two pieces of building information contain different physical or intangible electronic attributes. A computer programming code is provided to query the building data sets and gather desired building information from the selected data set as well as associate other unrelated data sets through common attributes contained within each data set.

One example of the invention is a method of storing and retrieving maintenance and operational documents for a building. An organizational table containing a plurality of records relating to a building is provided and populated. Each of the records in the organizational table has a plurality of associated data fields for recording data relating to at least one attribute of the plurality of building records with which it is associated. Drawing and non-drawing tables, each containing a plurality of records relating to at least one building also are provided and populated. Each of the drawing and non-drawing tables include records having a plurality of associated data fields for recording data relating to at least one attribute of the plurality of records with which the data is associated. At least one cross table containing records defining the relationships between at least two of the organizational, drawing and document tables is provided and populated. At least one electronic file is provided for storage of documents referenced by data in the drawing and non-drawing tables. An interface is used to access the records and associated data selectively.

In another example of the invention, a room identification table with a plurality of records relating to attributes of individual rooms is provided. The room identification table includes a plurality of records relating to attributes of individual rooms in at least one building and a plurality of associated data fields for recording data relating to at least one attribute of the plurality of individual room records with which it is associated. A room identification table is provided for linking the room identification table to at least one of the organizational, drawing or document tables by defining the relationships between the room identification table and at least one of the organizational, drawing or document tables.

In another example of the invention, a building system table including a plurality of records relating to attributes of different building systems in at least one building is provided. A plurality of associated data fields are included in the building system table for recording data relating to at least one attribute of the plurality of building system records with which it is associated. A building system cross table is provided to link the building system table to at least one of the organizational, drawing or document tables by defining the relationships between the building system table and at least one of the organizational, drawing or document tables.

In another example of the invention, a contact information table is provided and populated. The contact information table is linked to the organizational table.

In yet another example of the invention, a warranty table is provided. The warranty table includes a plurality of records relating to warranties for portions of the at least one building. A plurality of associated data fields are included in the warranty table for recording data relating to the plurality of warranties. A cross table is provided for linking the warranty table to at least one of the organizational, drawing or document tables by defining the relationships between the warranty table and at least one of the organizational table or contact information table.

In another example of the invention, a method of organizing, storing, and retrieving operational and maintenance information for a building is provided. The method includes the steps of providing and populating a plurality of data sets with information about a specific building, with each of the data sets having one or more of a plurality of specific linking attributes. Each of the data sets has one or more of a plurality of other unique attributes representing categories of information about the specific building, with each of the plurality of data sets including at least one unique attribute and at least one specific linking attribute that is shared by one or more other data sets. The shared specific linking attributes are used to relate the plurality of data sets to each other. The plurality of data sets are queried through a combination of their unique attributes and specific linking attributes to associate multiple pieces of previously unassociated building information regardless of whether the multiple pieces of previously unassociated building information include different physical or intangible electronic attributes. Previously unassociated pieces of information are presented as an associated data set of information.

BRIEF DESCRIPTION OF THE DRAWINGS

While the specification concludes with claims which particularly point out and distinctly claim the invention, it is believed the present invention will be better understood from the following description taken in conjunction with the accompanying drawings, in which like reference numbers identify the same elements in which:

FIG. 2 is a diagrammatic illustration depicting system architecture for an exemplary embodiment of the invention;

Reference will now be made in detail to certain exemplary embodiments of the invention, examples of which are illustrated in the accompanying drawings.

DETAILED DESCRIPTION OF EXEMPLARY EMBODIMENTS

Figure 1:
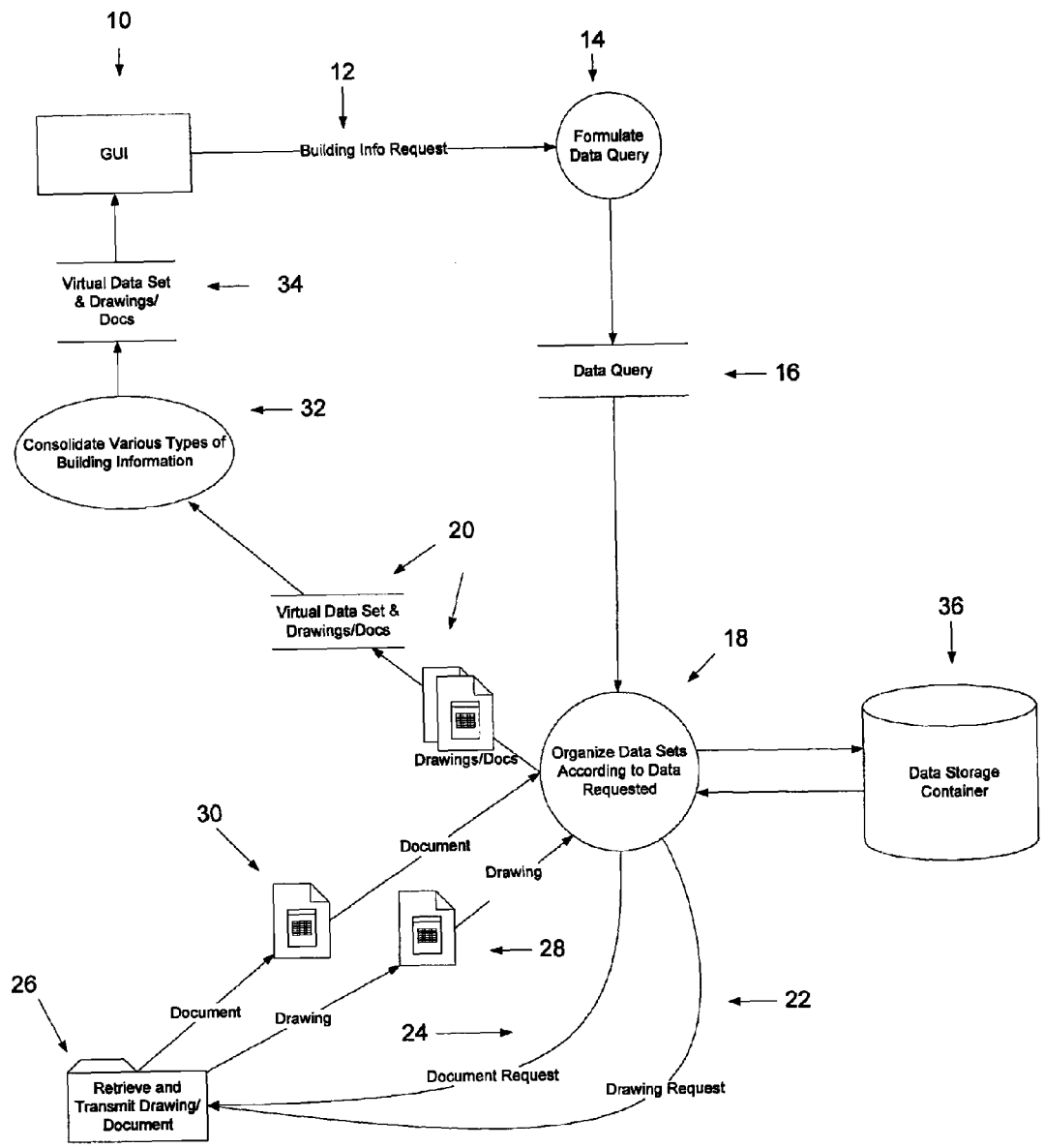
FIG. 1 is a diagrammatic illustration depicting a data organizational system for organizing, consolidating, and presenting building information in accordance with one exemplary embodiment of the invention.

Referring now to the drawings, FIG. 1 illustrates one exemplary embodiment of a system for processing, organizing, and presenting building information in accordance with the principles of the invention. In the specifically illustrated embodiment of FIG. 1, a graphical user interface 10 is used to allow a user to make inquiries about a building, and to retrieve only selective information of interest from a vast amount of information about the building. As explained in greater detail below, a user may make queries through the graphical user interface 10 to receive selective organized information, including any applicable drawings and documents associated with the requested building system, section or area of the building. The graphical user interface 10 may take any of a number of forms known to those skilled in the art, such as, for example, a keyboard and display. The graphical user interface 10 may be used by a user to interact with the system by inputting building information requests and receiving the requested building information.

The graphical user interface 10 may be embodied in any computer programming language, or alternatively, may contain any input form which collects the user requests. In one exemplary form of the invention, the graphical user interface 10 contains a visual output display for visually presenting to the user any drawings 28, documents 30, and building information that might be associated with the user requested information. Those skilled in the art will appreciate, however, that many types of interfaces might be used with the invention, including interfaces that reproduce retrieved documents without visual displays.

In the exemplary embodiment illustrated in FIG. 1, the graphical user interface 10 is shown communicating with a data query formulator 14. The interface 10 transmits, in response to user input, a request 12 for specific building information to the data query formulator 14. The data query formulator 14 typically is embodied in a computer program, and may be, for example, a part of the same executable code as the graphical user interface 10, or in a separate interconnected executable program. The data query formulator 14 manipulates and converts the building information request from the graphical user interface 10, and submits a data query 16 to a data organizational process 18, which may take the form of computer software program. In the specifically illustrated exemplary embodiment, the data organizational process 18 accesses the requested data within a data storage container 36 and then organizes the requested data into a virtual data set 20. The data storage container 36 of the illustrated exemplary embodiment, which may take various forms, such as a database, a flat file, or even a contemporaneously generated virtual data base, contains links to a file storage container 26, such as file server or other information storage device, where electronic/magnetic representations of drawings and documents containing the building information are physically stored. In the exemplary embodiment illustrated in FIG. 1, the data about various documents containing information about the building are stored in a plurality of different data sets. These data sets are selected according to the electronic attributes of the information contained on the documents. For example, data for documents containing images are arranged in a different data set than data for documents containing only text information. Each data set will include at least one unique attribute and at least one linking attribute that is shared by one or more other data sets.

The data organizational process 18 includes data set organizational structure for effectuating the generation of a new virtual data set 20 containing only the selected building information requested by the user through the graphical user interface 10. The data query 16 uses a combination of unique and shared attributes information solicited in the data query 16 that may include only data, such as the telephone number of a contact pertaining to a particular aspect of the building, or, in the more usual case, the data query 16 will solicit documents with information having attributes corresponding to the combination of attributes in the data query 16.

Figure 4:
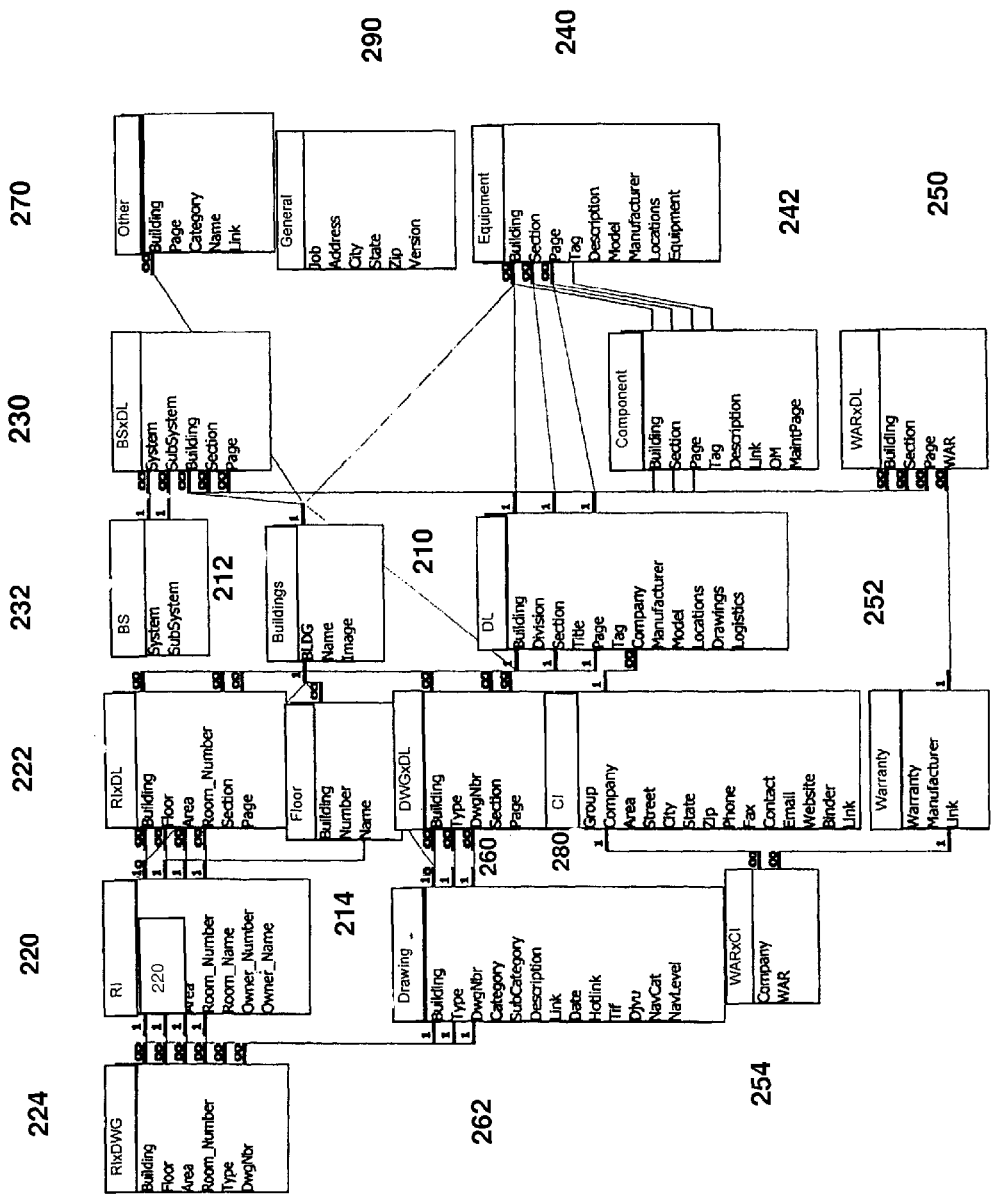
FIG. 4 illustrates is a schematic illustration depicting a series of interlinked tables showing an example of the invention in the form of a relational database structure.

The data organizational process 18, using the link information obtained through the storage container 36, then submits a drawing request 24 and a document request 22 to the file storage container 26. The drawing request 24 and document request 22 will only be submitted if a drawing 28 or document 30 associated with the requested virtual data set 20 exists. The data organizational process 18 determines if a drawing 28 or document 30 exists by analyzing the associated building information data sets. One such method of analyzing the data request is illustrated in FIG. 4, and described in greater detail below.

The file storage container 26 may be embodied separately from the data storage container 36. The drawings 28 and the documents 30, if applicable, are then consolidated and associated with the virtual data set 20 containing the requested building information 32. The consolidated set of information 34 may be organized and transmitted to the graphical user interface 10 for presentation to the user.

The graphical user interface 10 illustrated in the specific embodiment of FIG. 1 may be a web based computer program executable through a web browser. Alternatively, the graphical user interface 10 may be a stand alone executable software program, not otherwise executed by a web browser. The data organizational process 18, which as noted above, may be a database, a flat file or computer code for generating a virtual database, will, for purposes of simplicity of illustration and explanation, be described in the following description as a relational database. The file storage container 26, which may be any type of data storage device, will be specifically described and illustrated as a network file server. The documents 30 may be warranties, agreements, licenses, or any other type of document so associated with the design of a room or building, or the elements or systems within that room or building. The drawings 28 may be architectural drawings, system drawings, or other schematics or drawings so associated with the design of a room or building, or the elements and systems within that room or building. The entire illustrated embodiment represented in FIGS. 1, 2, and 3b may be executed on a single computing device, or as illustrated in FIG. 3a, distributed over a plurality of interconnected computing devices.

FIG. 2 illustrates an exemplary embodiment of the invention's system architecture. The user interface 50 communicates with code 52 by sending a building information request to the code 52. The code 52 may be embodied in a computer program. The code 52 may send a positive building information response to the user interface 10, which may include the results of the user interface's query, or a negative response indicating that the data storage container 56 does not contain the requested building information. The code 52 manages communications between the user interface 50 and the data organizational process 54. The user interface 50, code 52, and data organizational process 54 may all be, for example, contained within one executable program, or in a plurality of separate interconnected executable programs. In the exemplary form of the invention being specifically illustrated, the data organizational process 54 may be a relational database 54. The data storage container 56 may be, for example, embodied in computer files stored in non-volatile memory, or a volatile memory. The data sets 58 may be embodied, for example, within a relational database table structure or within a non-relational data file system. The specifically illustrated data sets 58 may contain room information, contact information, equipment information, component information, warranty information, system information, and other information relating to the construction and maintenance of a building.

In the illustrated embodiments, the data organizational process 54 receives queries from the code 52 and interprets the queries in order to access the appropriate data contained within each data set 58. The data organizational process may also access the file storage container 60 which may hold drawings 66 and documents 68 associated with the requested building information. The data organizational process 54 determines if such drawings 66 or documents 68 exist and if so retrieves them from the file storage container 60. The data organizational process 54 may then organize the drawings 66, documents 68, and data 58 according to the user interface's 50 request. The code 52 receives the requested building information and presents it to the user interface 50 according to the user interface's 50 specifications. The user interface 50 may be a web or network based computer program, or a non-network based computer program.

Figure 3A:
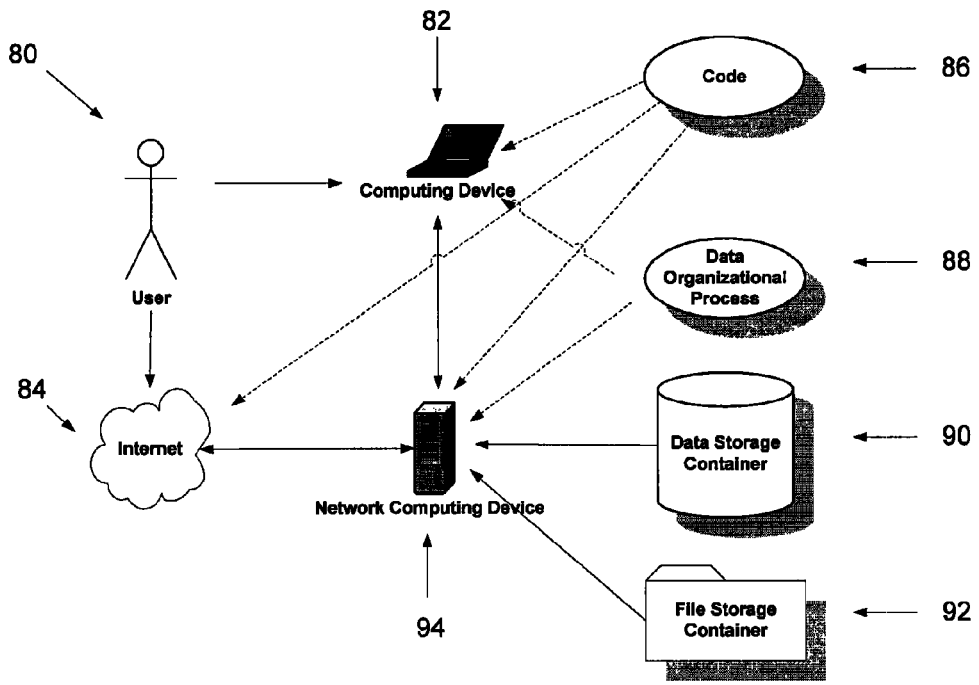
FIG. 3a is a diagrammatic illustration depicting an exemplary embodiment of the invention in conjunction with a network computing device.

FIG. 3a illustrates an exemplary embodiment of the invention in which the user 80 of the invention accesses the invention using a computing device 82, and at least one component of the invention is not located on the computing device 82. The computing device 82, which may include all or only some of the operational components of the document management system, may be a computing device capable of communicating over computer networks, processing computer programming code, and inputting and outputting information. The code 86 may be, for example, physically located and executed on the computing device 82 or physically located on a network computing device 94. The code 86 may be executed by an internet browser 84 communicating with the code 86 over a computer network. The computing device 82 or the internet browser 84 may be interconnected with the network computing device 94 through a computer network. The computing device 82 or the internet browser 84 present the results of the user's 80 query. The data organizational process 88 may be physically located, for example, on the computing device 82 or the network computing device 94. The data storage container 90 may be located on the network computing device 94. Finally, the file storage container 92 may be physically located on the network computing device 94.

Figure 3B:
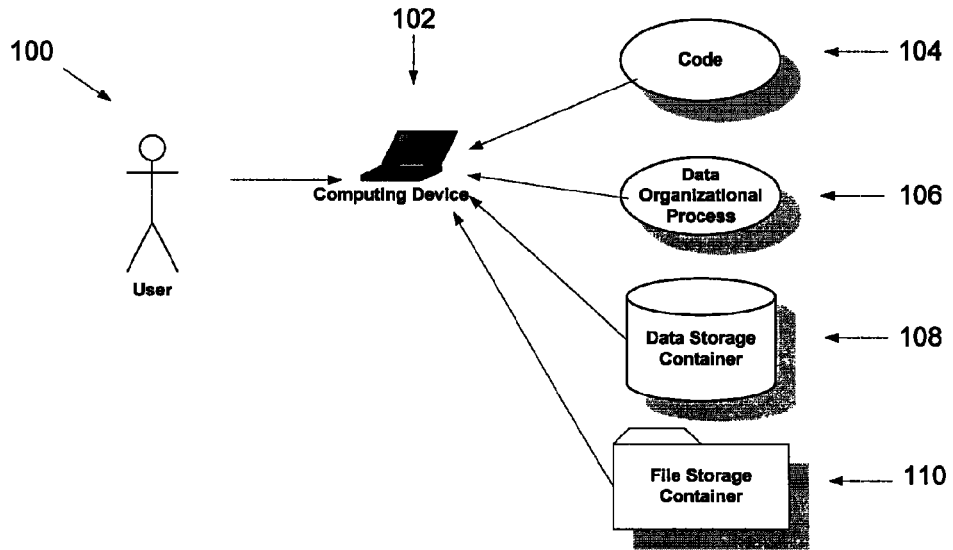
FIG. 3b is a diagrammatic illustration depicting another exemplary embodiment of the invention illustrates an additional embodiment of the physical structure of the system embodied in the invention.

FIG. 3b illustrates an alternative embodiment of the invention in which a user 100 accesses the invention using a computing device 102 that contains every component of the invention. The code 104, data organizational process 106, data storage container 108, and file storage container 110 are all physically located and executed on the computing device 102. The code 104 and the data organizational process 106 may be, for example, a single executable program, or separate interconnected executable programs. The computing device 102 presents the requested information to the user 100.

FIG. 4 illustrates a schematic of the tables contained in one exemplary data organizational process 18 (see FIG. 1). In the specific embodiment of FIG. 4, the data organizational process 18 used to analyze inquiries from a user 80 (FIG. 3b) is depicted as a relational database. As illustrated in FIG. 4, a building organizational table 210 contains record keys that relationally link to record keys contained in various drawing, document, and cross tables enabling the association of any one data type to another. In other words, the data structure illustrated in FIG. 4 is a method of associating and organizing data relating to the construction and maintenance of a building, at the room, system, floor, component, or building level. For example, the room linking table 220 contains record keys that link, either directly or indirectly, to all other tables within the FIG. 4. That is, a specific room is associated with the floor, building, warranties, components, systems, equipment, drawings, documents, contact information, and other information not merely related to, or necessary for, the construction and maintenance of the building, but also for a specific system, floor, or room.

More specifically, as shown in the embodiment illustrated in FIG. 4, the building organizational table 210 contains the record key Building that relationally links to, for example, the room linking table 220, building system linking table 230, equipment linking table 240, component document table 242, warranty linking table 250, building drawing table 260, and other document table 270. In other words, the room drawing table 224 and the room document table 222 contain the record key Room Number that relationally links back to the room linking table 220, which is relationally linked to the building organizational table 210. The building system document table 232 contains the record key System that relationally links back to the building system linking table 230, which is relationally linked to the building organizational table 210. The equipment linking table 240 and the component document table 242 are relationally linked to each other through the record key Tag, and relationally linked to the building organizational table 210. The warranty document table 252 may contain the record key Warranty that relationally links to the warranty linking table 250, which is relationally linked to the building organizational table 210. The building drawing table 260 is relationally linked to the drawing table 262 through the record key Building, which is relationally linked to the building organizational table 210. The other document table 270 is relationally linked through the record key Building to the building organizational table 210. The contact information document table 280 is relationally linked through the record key Company to the building organizational table 210.

Further, the drawing table 262 may be relationally linked to both the room drawing table 224 and the building drawing table 260 through the record key DwgNbr, and contains a reference to the physical location of an electronic file of the drawing embodied in the table column Link The warranty document table 252 may contain a table column Link that contains a reference to the physical location of an electronic file of the warranty. The component document table 242 may contain a table column Link that contains a reference to the physical location of an electronic file of the component documents. The contact information document table 280 may contain a table column Link that contains a reference to the physical location of an electronic file of the contact information documents. Finally, the other documents table 270 contains a table column Link that contains a reference to the physical location of an electronic file of the other documents.

The building linking table 212 may be relationally linked to the floor organizational table 214 through the record key BLDG. The floor linking table 214 may be relationally linked to the room linking table 220 through the record key Building. The room linking table 220 may be relationally linked to the building organizational table 210 through the record key Building. The building linking table 212 may be relationally linked to the building system linking table 230 and the other document table 270 through the record key BLDG. The contact information document table 280 may be relationally linked to the building organizational table 210 through the record key Company. The general table 290 may be an unassociated table containing unique job information.

Through the record key association (illustrated above) in FIG. 4, the invention allows any combination of data contained within any table to be so associated by an interface. Such interface may, for example, query all warranties associated with all components found in a specified room, on a specified floor, or within a specified building.

The foregoing description of the preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed is:

1. A method of storing and retrieving maintenance and operational documents for a building, comprising the steps of:
   a) providing and populating an organizational table, the organizational table containing a plurality of records relating to at least one building, each of the records in the organizational table having a plurality of associated data fields for recording data relating to at least one attribute of the plurality of building records with which the building records data is associated;
   b) providing and populating a drawing table, the drawing table containing a plurality of records relating to drawings for the at least one building, each of the records in the drawing table having a plurality of associated data fields for recording data relating to at least one attribute of the plurality of drawing records with which the drawing records data is associated;
   c) providing and populating a document table, the document table containing a plurality of records relating to non-drawing aspects of the at least one building, each of the records in the document table having a plurality of associated data fields for recording data relating to at least one attribute of the plurality of non-drawing aspect records with which the non-drawing data is associated;
   d) providing and populating at least one cross table containing records defining the relationships between at least two of the organizational, drawing and document tables;
   e) providing and populating at least one electronic file for document storage referenced by data in the drawing and document tables;
   f) providing at least one feature table including a plurality of records relating to attributes of a selected feature of the building;
   g) providing and populating at least one feature cross table linking the feature table to at least one of the organizational, drawing or documents by defining the relationships between the feature table and at least one of the organizational, drawing or document tables;
   h) providing an interface to access the records and associated data; and
   i) accessing selective documents in the at least one electronic file by selecting records and data through the interface.

2. A method as recited in claim 1 wherein the step of providing at least one feature table includes providing and populating a room identification table, the room identification table including a plurality of records relating to attributes of individual rooms in the at least one building and a plurality of associated data fields for recording data relating to at least one attribute of the plurality of individual room records with which the individual rooms data is associated, and wherein the step of populating at least one feature cross table includes providing and populating at least one room identification cross table linking the room identification table to at least one of the organizational, drawing or document tables by defining the relationships between the room identification table and at least one of the organizational, drawing or document tables.

3. A method as recited in claim 1 wherein the step of providing at least one feature table includes providing and populating a building system table, the building system table including a plurality of records relating to attributes of different building systems in the at least one building, and a plurality of associated data fields for recording data relating to at least one attribute of the plurality of building system records with which it is associated, and wherein the step of providing and populating at least one feature table includes providing and populating at least one building system cross table linking the building system table to at least one of the organizational, drawing or document tables by defining the relationships between the building system table and at least one of the organizational, drawing or document tables.

4. A method as recited in claim 1 further including the step of providing and populating a contact information table, the contact information table being linked to the organizational table.

5. A method as recited in claim 4 wherein the step of providing at least one feature table includes providing and populating a warranty table, the warranty table including a plurality of records relating to warranties for portions of the at least one building, and a plurality of associated data fields for recording data relating to the plurality of warranties, and wherein the step of providing and populating at least one feature cross table includes providing and populating a cross table linking the warranty table to at least one of the organizational, drawing or document tables by defining the relationships between the warranty table and at least one of the organizational table or contact information table.

6. A method as recited in claim 2 wherein the step of providing at least one feature table includes providing and populating a building system table, the building system table including a plurality of records relating to attributes of different building systems in the at least one building, and a plurality of associated data fields for recording data relating to at least one attribute of the plurality of building system records with which it is associated, and wherein the step of providing and populating at least one feature cross table includes providing and populating at least one building system cross table linking the building system table to at least one of the organizational, drawing or document tables by defining the relationships between the building system table and at least one of the organizational, drawing or document tables.

7. A method as recited in claim 6 wherein the step of providing at least one feature table includes providing and populating a warranty table, the warranty table including a plurality of records relating to warranties for portions of the at least one building, and a plurality of associated data fields for recording data relating to the plurality of warranties, and and wherein the step of providing and populating at least one cross table includes providing and populating a cross table linking the warranty table to at least one of the organizational, drawing or document tables by defining the relationships between the warranty table and at least one of the organizational, drawing or document tables.

8. A method as recited in claim 7 wherein the drawing table, the building system table, and the warranty table are interlinked to each other.

9. A method as recited in claim 1 wherein the drawing table includes a plurality of records pertaining to drawing categories.

10. A system adapted to store and retrieve maintenance and operational documents electronically for a building, the system comprising:
 a processor;
 a memory unit that stores instructions associated with an application executed by the processor; and an interconnect coupling the processor and the memory unit, the interconnect enabling the system to execute the operations of:
 a) providing and populating an organizational table, the organizational table containing a plurality of records relating to at least one building, each of the records in the organizational table having a plurality of associated data fields for recording data relating to at least one attribute of the plurality of building records with which the building records data is associated;
 b) providing and populating a drawing table, the drawing table containing a plurality of records relating to drawings for the at least one building, each of the records in the drawing table having a plurality of associated data fields for recording data relating to at least one attribute of the plurality of drawing records with which the drawing table data is associated;
 c) providing and populating a document table, the document table containing a plurality of records relating to non-drawing aspects of the at least one building, each of the records in the document table having a plurality of associated data fields for recording data relating to at least one attribute of the plurality of non-drawing aspect records with which the non-drawing data is associated;
 d) providing and populating at least one cross table containing records defining the relationships between at least two of the organizational, drawing and document tables;
 e) providing and populating at least one electronic file for document storage referenced by data in the drawing and document tables;
 f) providing at least one feature table including a plurality of records relating to attributes of a selected feature of the building;
 g) providing and populating at least one feature cross table linking the feature table to at least one of the organizational, drawing or documents by defining the relationships between the feature table and at least one of the organizational, drawing or document tables;
 h) providing an interface to access the records and associated data; and
 i) accessing selective documents in the at least one electronic file by selecting records and data through the interface.

11. A non-transitory computer readable medium comprising computer executable instructions adapted to store and retrieve maintenance and operational documents for a building, the computer executable instructions adapted to execute the operations of:
 a) providing and populating an organizational table, the organizational table containing a plurality of records relating to at least one building, each of the records in the organizational table having a plurality of associated data fields for recording data relating to at least one attribute of the plurality of building records with which the building records data is associated;
 b) providing and populating a drawing table, the drawing table containing a plurality of records relating to drawings for the at least one building, each of the records in the drawing table having a plurality of associated data fields for recording data relating to at least one attribute of the plurality of drawing records with which the drawing records data is associated;
 c) providing and populating a document table, the document table containing a plurality of records relating to non-drawing aspects of the at least one building, each of the records in the document table having a plurality of associated data fields for recording data relating to at least one attribute of the plurality of non-drawing aspect records with which the non-drawing data is associated;
 d) providing and populating at least one cross table containing records defining the relationships between at least two of the organizational, drawing and document tables;
 e) providing and populating at least one electronic file for document storage referenced by data in the drawing and document tables;
 f) providing at least one feature table including a plurality of records relating to attributes of a selected feature of the building;
 g) providing and populating at least one feature cross table linking the feature table to at least one of the organizational, drawing or documents by defining the relationships between the feature table and at least one of the organizational, drawing or document tables;
 h) providing an interface to access the records and associated data; and
 i) accessing selective documents in the at least one electronic file by selecting records and data through the interface.

12. A method of storing and retrieving maintenance and operational documents for a building, comprising the steps of:
 a) providing an organizational table, the organizational table containing a plurality of records relating to at least one building, each of the records in the organizational table having a plurality of associated data fields for recording data relating to at least one attribute of the plurality of building records with which the building records data is associated;
 b) providing a drawing table, the drawing table containing a plurality of records relating to drawings for the at least one building, each of the records in the drawing table having a plurality of associated data fields for recording data relating to at least one attribute of the plurality of drawing records with which the drawing records data is associated;
 c) providing a document table, the document table containing a plurality of records relating to non-drawing aspects of the at least one building, each of the records in the document table having a plurality of associated data fields for recording data relating to at least one attribute of the plurality of non-drawing aspect records with which the non-drawing data is associated;
 d) providing at least one cross table containing records defining the relationships between at least two of the organizational, drawing and document tables;
 e) providing at least one electronic file for document storage referenced by data in the drawing and document tables;

f) providing at least one feature table including a plurality of records relating to attributes of a selected feature of the building;

g) providing and populating at least one feature cross table linking the feature table to at least one of the organizational, drawing or documents by defining the relationships between the feature table and at least one of the organizational, drawing or document tables;

h) providing an interface to access the records and associated data; and i) accessing selective documents in the at least one electronic file by selecting records and data through the interface.

\* \* \* \* \*

UNITED STATES PATENT AND TRADEMARK OFFICE
CERTIFICATE OF CORRECTION

PATENT NO. : 8,195,723 B2
APPLICATION NO. : 12/171706
DATED : June 5, 2012
INVENTOR(S) : Michael Murdock et al.

It is certified that error appears in the above-identified patent and that said Letters Patent is hereby corrected as shown below:

Claim 7, Column 10, line 63, change "and and" to --and--

Signed and Sealed this
Nineteenth Day of February, 2013

Teresa Stanek Rea
*Acting Director of the United States Patent and Trademark Office*